(12) United States Patent
Chou (10) Patent No.: US 7,040,192 B2
(45) Date of Patent: May 9, 2006

(54) ADJUSTABLE HANDLEBAR MOUNTING DEVICE FOR MOUNTING A HANDLEBAR ON A BICYCLE FRAME

(75) Inventor: Joe Chou, Tai-Ping (TW)

(73) Assignee: Giant Manufacturing Co., Ltd., Taichung Hsien (TW)

(*) Notice: Subject to any disclaimer, the term of this patent is extended or adjusted under 35 U.S.C. 154(b) by 364 days.

(21) Appl. No.: 10/446,616

(22) Filed: May 27, 2003

(65) Prior Publication Data
US 2004/0237702 A1    Dec. 2, 2004

(51) Int. Cl.
    B62K 21/16    (2006.01)
(52) U.S. Cl. .................. 74/551.3; 74/551.5; 74/551.7; 280/279
(58) Field of Classification Search ........... 74/551.1, 74/551.3, 551.7, 510, 511 R, 548; 280/279, 280/655.1, 47.371; 248/125.8, 159, 407, 248/410, 411; 403/22, 68, 69, 70, 83, 116, 403/150, 195, 196
See application file for complete search history.

(56) References Cited

U.S. PATENT DOCUMENTS 5,138,900 A * 8/1992 Hals .......................... 74/551.7
5,201,244 A * 4/1993 Stewart et al. ............. 74/551.3
5,241,881 A * 9/1993 Chen .......................... 74/551.2
5,323,664 A * 6/1994 Fairfield et al. ............ 74/551.3
5,887,490 A * 3/1999 Dittmar ..................... 74/551.3
6,004,064 A * 12/1999 Franz ...................... 403/322.4
6,173,976 B1 * 1/2001 Lee .......................... 280/87.05
6,301,749 B1 * 10/2001 Chen .......................... 16/429
6,845,997 B1 * 1/2005 Chou ......................... 280/278

FOREIGN PATENT DOCUMENTS

DE    4224374 A1 *  1/1993
GB    2300841 A  * 11/1996

* cited by examiner

Primary Examiner—Richard W. Ridley
(74) Attorney, Agent, or Firm—Christensen O'Connor Johnson Kindness PLLC (57) ABSTRACT

An adjustable handlebar mounting device includes a frame mounting member, a front pivot member, a rear pivot member, and a releasable fastening unit. The frame mounting member is formed with front and rear lug units. The front pivot member has a front lower section connected pivotally to the front lug unit, a front upper section to be connected to a handlebar, and an intermediate coupling part. The rear pivot member has a rear lower section connected pivotally to the rear lug unit, and a rear upper section. The coupling part and the rear upper section are respectively formed with a slot unit and a hole unit for extension of the fastening unit therethrough. The fastening unit is operable so as to press the coupling part and the rear upper section firmly against each other for supporting the handlebar.

6 Claims, 9 Drawing Sheets

ADJUSTABLE HANDLEBAR MOUNTING DEVICE FOR MOUNTING A HANDLEBAR ON A BICYCLE FRAME

BACKGROUND OF THE INVENTION

1. Field of the Invention

The invention relates to a handlebar mounting device, more particularly to an adjustable handlebar mounting device that permits adjustment of the height and distance of a handlebar relative to a seat on a bicycle frame.

2. Description of the Related Art

Figure 1:
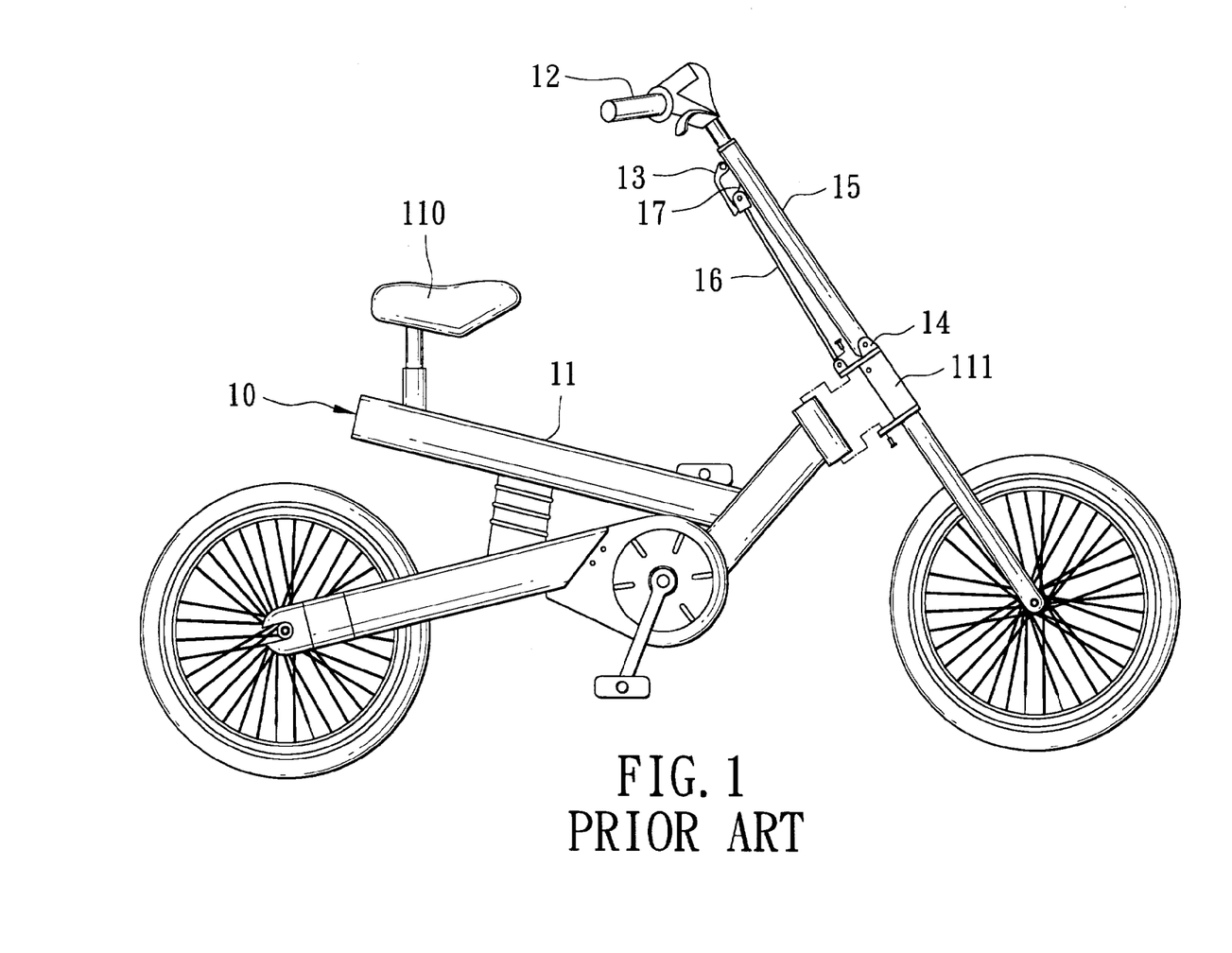
FIG. 1 is a schematic diagram illustrating a bicycle with a conventional adjustable handlebar mounting device.
Figure 2:
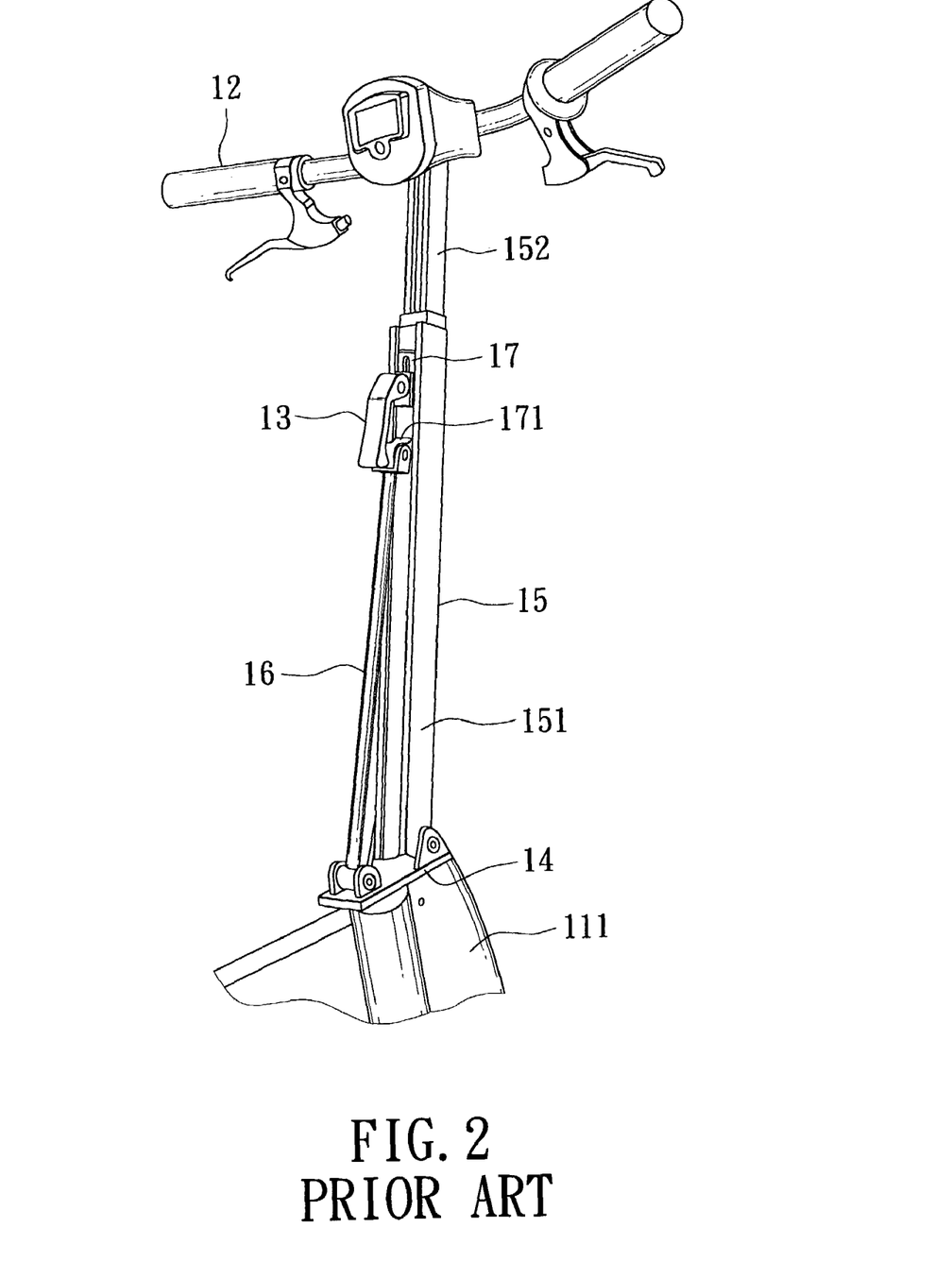
FIG. 2 is an assembled perspective view of the conventional adjustable handlebar mounting device of FIG. 1.
Figure 3:
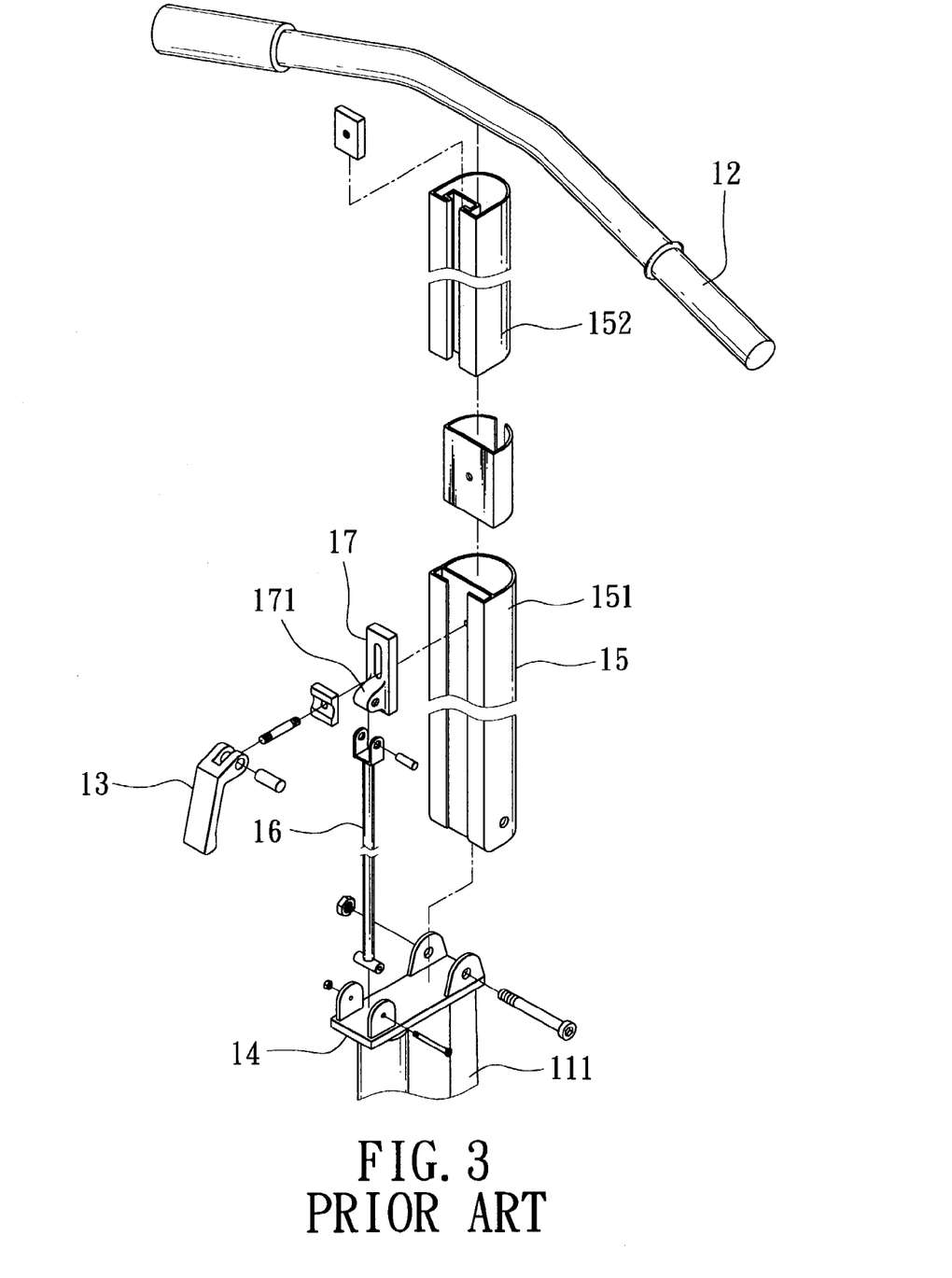
FIG. 3 is an exploded perspective view of the conventional adjustable handlebar mounting device of FIG. 1.

FIGS. 1 to 3 illustrate a conventional bicycle 10 with an adjustable handlebar mounting device for mounting a handlebar 12 on a bicycle frame 11. The handlebar mounting device includes a bottom link member 14 to be installed on top of a head tube 111 of the bicycle frame 11, front and rear link members 15, 16 connected pivotally to the bottom link member 14, and a top link member 17 connected pivotally to the rear link member 16 and fastened to the front link member 15.

The front link member 15 includes an outer tube 151 having a lower section connected to the bottom link member 14, and an inner tube 152 slidably extending into the outer tube 151 and having a top end connected to the handlebar 12.

The top link member 17 is mounted slidably on the outer tube 151, and has a pivot block 171 coupled to the rear link member 16.

A quick release fastener 13 is mounted between the top link member 17 and the inner tube 152, and is operable so as to position the top link member 17 relative to the outer tube 151. Accordingly, the front and rear link members 15, 16 can be positioned to retain the handlebar 12 at a desired height and distance relative to a seat 110 on the bicycle frame 11. On the other hand, when the fastener 13 is operated to release the top link member 17, the top link member 17 can be slid along the outer tube 151 for adjusting the height of the handlebar 12, and the front and rear link members 15, 16 can be pivoted relative to the bottom link member 14 so as to adjust the distance of the handlebar 12 from the seat 110. Therefore, a comfortable grasping position of the handlebar 12 can be achieved in this manner.

However, it is noted that the aforesaid adjustable handlebar mounting device includes too many components, which results in a rather complicated assembly process.

SUMMARY OF THE INVENTION

Therefore, the object of the present invention is to provide an adjustable handlebar mounting device that can facilitate adjustment of the position of a handlebar on a bicycle frame and that involves fewer components to result in a simpler assembly process and lower manufacturing costs.

Accordingly, the adjustable handlebar mounting device of this invention is adapted for mounting a handlebar on a bicycle frame, and comprises a frame mounting member, an elongate front pivot member, an elongate rear pivot member, and a releasable fastening unit.

The frame mounting member is adapted to be mounted on the bicycle frame, and is formed with a front lug unit and a rear lug unit opposite to each other in a first direction.

The front pivot member extends in a second direction, and has a front lower section and a front upper section opposite to each other in the second direction. The front lower section is connected pivotally to the front lug unit, and is pivotable about a first pivot axis transverse to the first direction. The front upper section is adapted to be connected to the handlebar. The front pivot member further has a coupling part between the front lower section and the front upper section.

The rear pivot member extends in a third direction, and has a rear lower section and a rear upper section opposite to each other in the third direction. The rear lower section is connected pivotally to the rear lug unit, and is pivotable about a second pivot axis parallel to the first pivot axis.

One of the coupling part of the front pivot member and the rear upper section of the rear pivot member is formed with a hole unit that has a hole axis parallel to the first and second pivot axes.

The other of the coupling part of the front pivot member and the rear upper section of the rear pivot member is formed with a slot unit that extends along the length of the other of the coupling part of the front pivot member and the rear upper section of the rear pivot member.

The releasable fastening unit extends through the hole unit and the slot unit, and is operable so as to press the coupling part of the front pivot member and the rear upper section of the rear pivot member firmly against each other, thereby enabling the rear pivot member to support the front pivot member at a desired inclination relative to the frame mounting member.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 4:
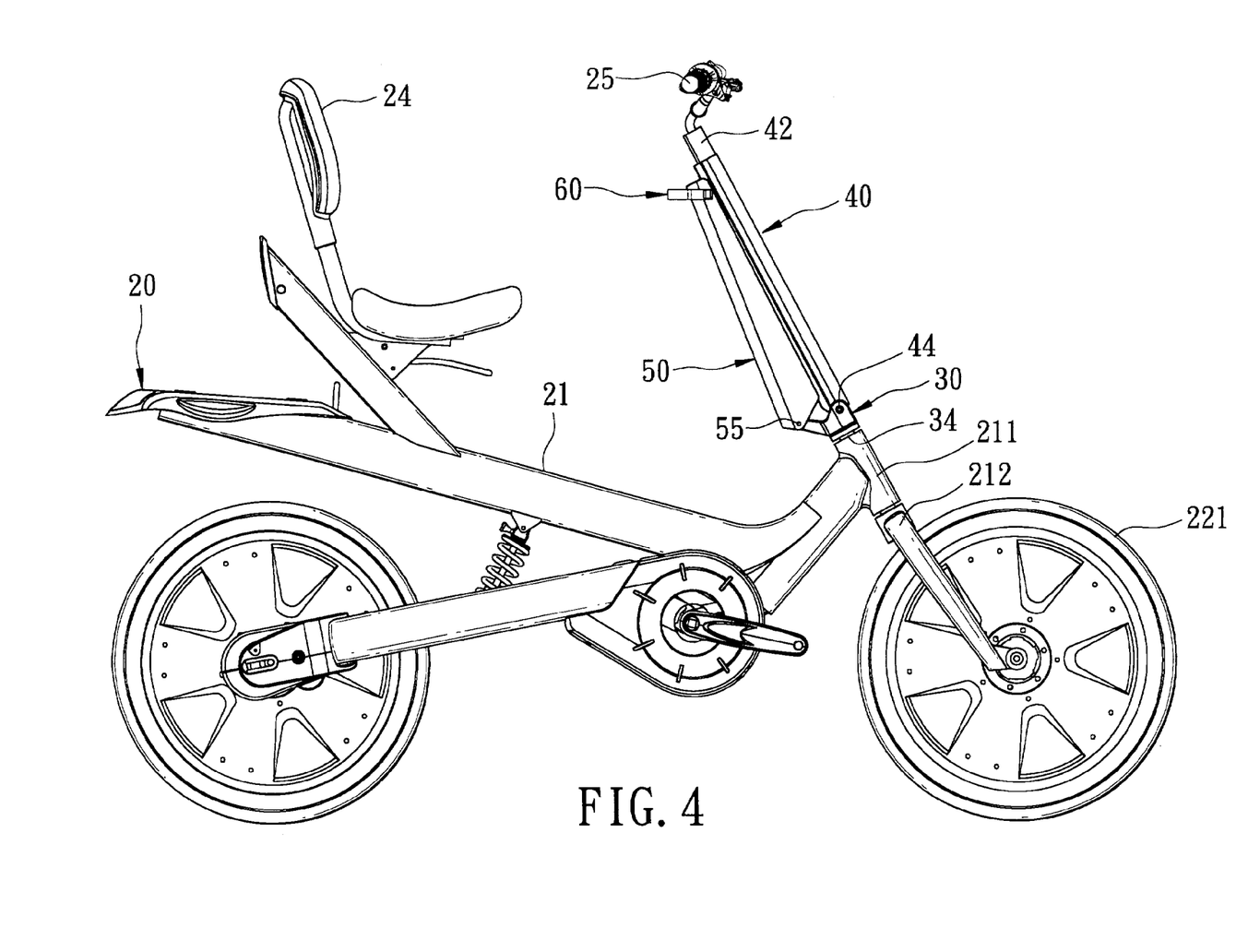
FIG. 4 is a schematic diagram illustrating a bicycle that incorporates the preferred embodiment of an adjustable handlebar mounting device according to the present invention.
Figure 5:
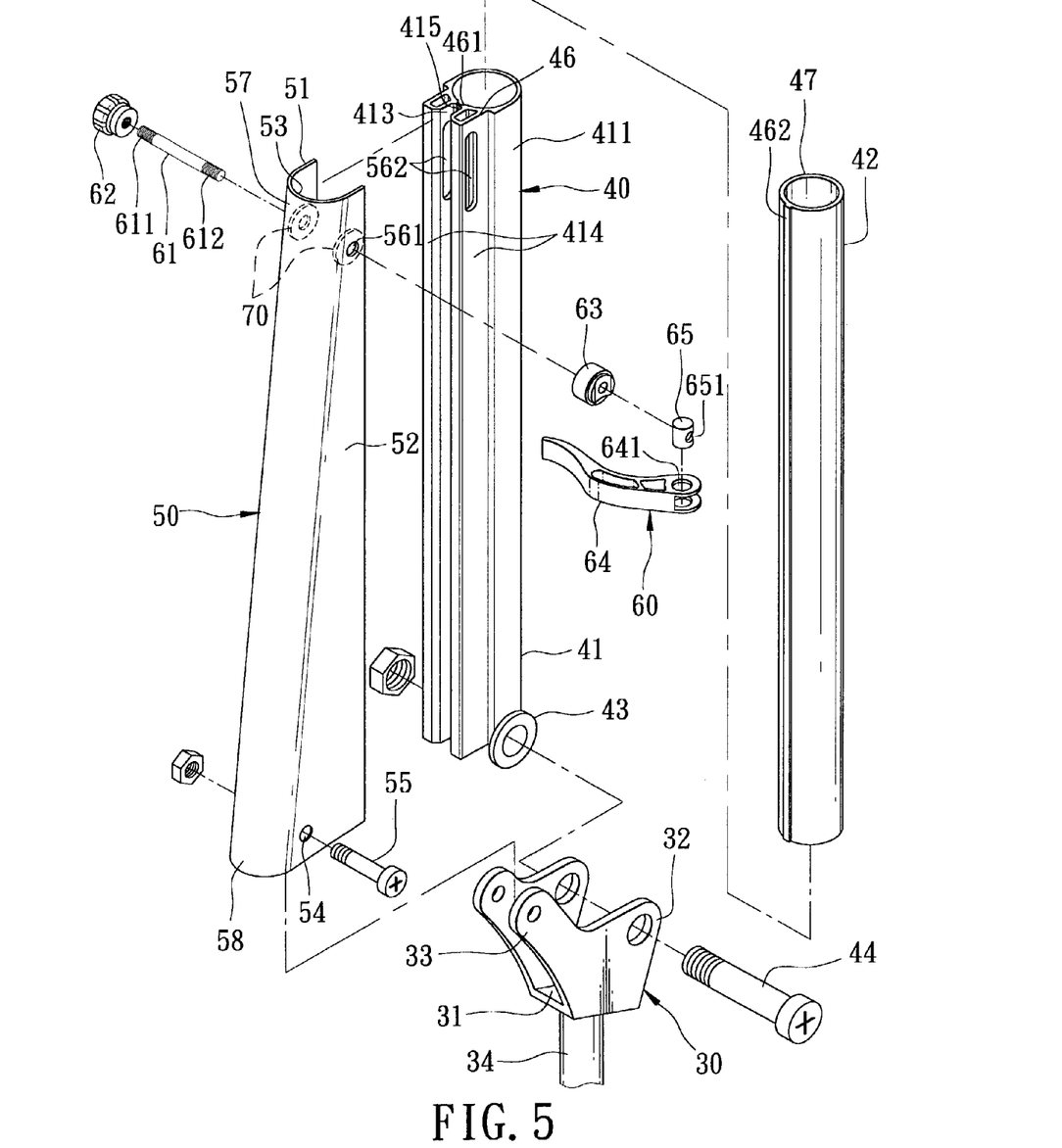
FIG. 5 is an exploded perspective view of the preferred embodiment.
Figure 6:
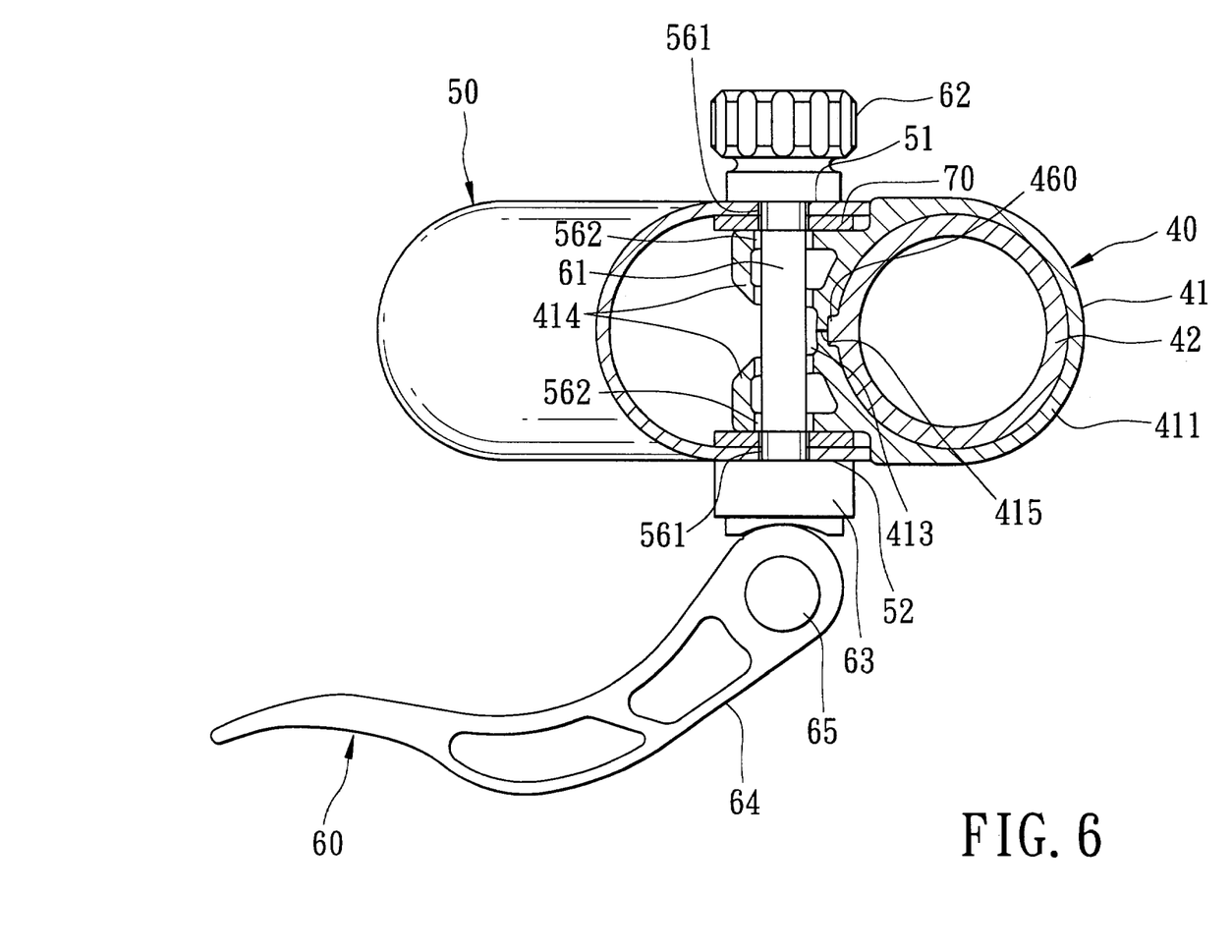
FIG. 6 is a sectional view of the preferred embodiment to illustrate a fastening state of a releasable fastening unit.

Referring to FIGS. 4, 5 and 6, the preferred embodiment of an adjustable handlebar mounting device according to the present invention is shown to be adapted for mounting a handlebar 25 on a bicycle frame 21 of a bicycle 20. The adjustable handlebar mounting device includes a frame mounting member 30, an elongate front pivot member 40, an elongate rear pivot member 50, and a releasable fastening unit 60.

The frame mounting member 30, which is adapted to be mounted on the bicycle frame 21, includes a base portion 31 formed with a front lug unit 32 and a rear lug unit 33 that are opposite to each other in a first direction. A connecting rod 34 is fixed to a bottom side of the base portion 31, extends through a head tube 211 of the bicycle frame 21, and is connected to a front fork 212 of the bicycle 20 so as to permit steering control of a front wheel 221 on the front fork 212.

The front pivot member 40 extends in a second direction, and includes an outer tube 41 and an inner tube 42 slidably extending into the outer tube 41. The inner tube 42 is formed with a front upper section 47 of the front pivot member 40 that is adapted to be connected to the handlebar 25. The outer tube 41 is formed with a front lower section 43 of the front pivot member 40 that is opposite to the front upper section 47 in the second direction, and a coupling part 46 between the front lower section 43 and the front upper section 47. The front lower section 43 is connected pivotally to the front lug unit 32 by a front pivot axle 44 that defines a first pivot axis transverse to the first direction such that the front lower section 43 is pivotable thereabout.

The outer tube 41 includes a tube body 411 formed with a slit 415 that extends in the second direction, and a pair of coupling lugs 414 that are disposed on opposite sides of the slit 415, that cooperate to form a notch 413 therebetween, and that serve as the coupling part 46 of the front pivot member 40. In this embodiment, the coupling part 46 of the front pivot member 40 is formed with a slot unit that includes a pair of slots 562, each of which is formed in a respective one of the coupling lugs 414 and extends along the length of the coupling part 46 of the front pivot member 40.

In the preferred embodiment, the front pivot member 40 further includes arresting means 460 for arresting relative rotation between the outer and inner tubes 41, 42. In this embodiment, the arresting means 460 includes an axially extending key 462 formed along the inner tube 42, and an axially extending keyway 461 formed along the outer tube 41 to slidably engage the key 462, thereby arresting relative rotation between the outer and inner tubes 41, 42 while permitting sliding movement of the inner tube 42 in the second direction relative to the outer tube 41. It should be noted herein that the positions of the key 462 and the keyway 461 on the inner and outer tubes 42, 41 maybe interchanged without affecting the intended result.

The rear pivot member 50 extends in a third direction, and has a rear lower section 58 and a rear upper section 57 opposite to each other in the third direction. The rear lower section 58 is formed with a pivot hole 54, and is connected pivotally to the rear lug unit 33 by a rear pivot axle 55. The rear lower section 58 is thus pivotable about a second pivot axis parallel to the first pivot axis defined by the front pivot axle 44. The rear upper section 57 of the rear pivot member 50 is formed with a pair of wing plates 51, 52 that are interconnected by a connecting plate 53. The wing plates 51, 52 confine the coupling lugs 414 of the coupling part 46 of the front pivot member 40 therebetween. The rear upper section 57 of the rear pivot member 50 is further formed with a hole unit that includes a pair of holes 561, each of which is formed in a respective one of the wing plates 51, 52, and that has a hole axis parallel to the first and second pivot axes. It should be noted herein that the positions of the hole unit and the slot unit in the rear upper section 57 of the rear pivot member 50 and the coupling part 46 of the front pivot member 40 may be likewise interchanged without affecting the intended result.

The releasable fastening unit 60 extends through the hole unit and the slot unit, and is operable so as to press the coupling part 46 of the front pivot member 40 and the rear upper section 57 of the rear pivot member 50 firmly against each other, thereby enabling the rear pivot member 50 to support the front pivot member 40 at a desired inclination relative to the frame mounting member 30. The releasable fastening unit 60 includes a connecting rod 61, a cap 62, a press member 63, a pivot 65, and a lever 64.

The connecting rod 61 passes through the holes 561 in the wing plates 51, 52, the slots 562 in the coupling lugs 414, and the notch 413 between the coupling lugs 414, and has opposite first and second ends 611, 612.

The cap 62 is mounted threadedly on the first end 611 of the connecting rod 61, and presses against an outer plate surface of the wing plate 51.

The press member 63 has the second end 612 of the connecting rod 61 passing therethrough, and is disposed adjacent to an outer plate surface of the wing plate 52.

The pivot 65 is formed with an internally threaded hole 651 for mounting on the second end 612 of the connecting rod 61, and defines a third pivot axis transverse to the connecting rod 61.

The lever 64 is formed with a pivot hole 641 for connecting with the pivot 65, and is pivotable about the third pivot axis so as to urge the press member 63 toward the cap 62 for pressing the coupling part 46 of the front pivot member 40 and the rear upper section 57 of the rear pivot member 50 firmly against each other, as best shown in FIG. 6.

Preferably, two washers 70 are sleeved on the connecting rod 61 and are disposed between a respective coupling lug 414 and a respective wing plate 51, 52.

Referring to FIG. 6, when the lever 64 is operated so as to urge the press member 61 toward the cap 62 for pressing the coupling part 46 of the front pivot member 40 and the rear upper section 57 of the rear pivot member 50 firmly against each other, the slit 415 is closed to enable the outer tube 41 to engage tightly the inner tube 42. Hence, with further reference to FIGS. 4 and 5, the handlebar 25 on the front upper section 47 of the front pivot member 40 is retained at a desired height relative to the frame mounting member 30 at this time.

Figure 7:
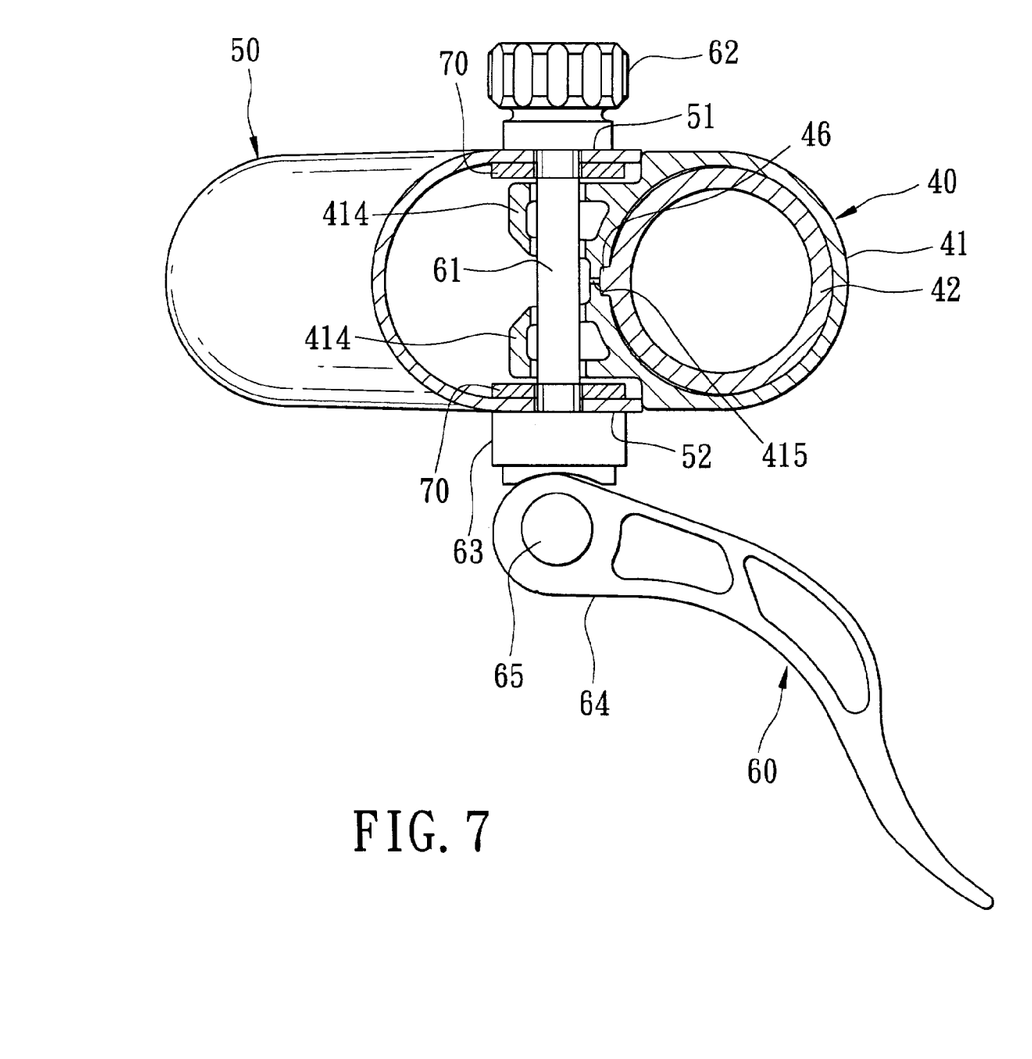
FIG. 7 is another sectional view of the preferred embodiment to illustrate a releasing state of the releasable fastening unit.
Figure 8:
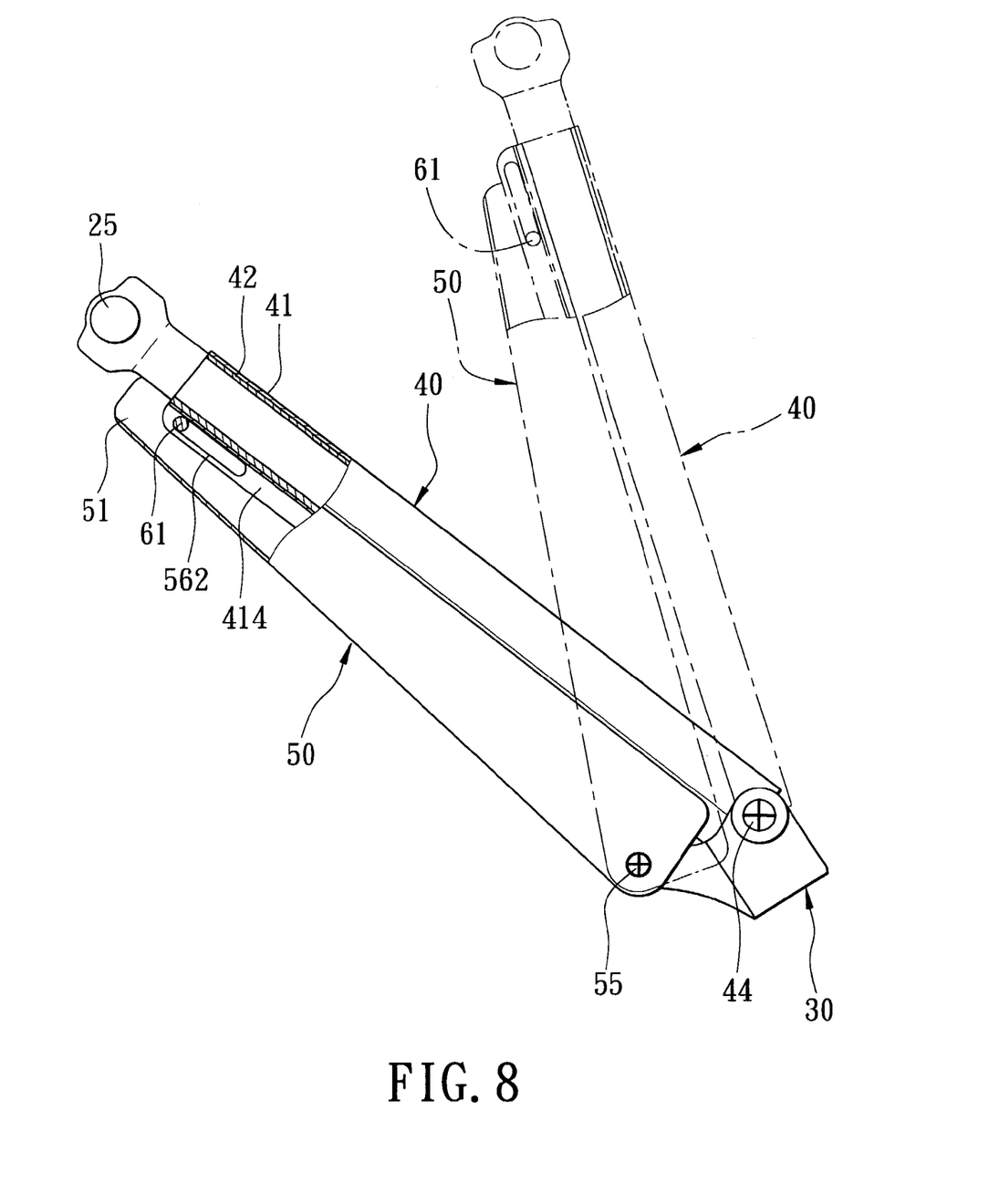
FIG. 8 is a schematic partly sectional view to illustrate how handlebar distance can be adjusted in the preferred embodiment.
Figure 9:
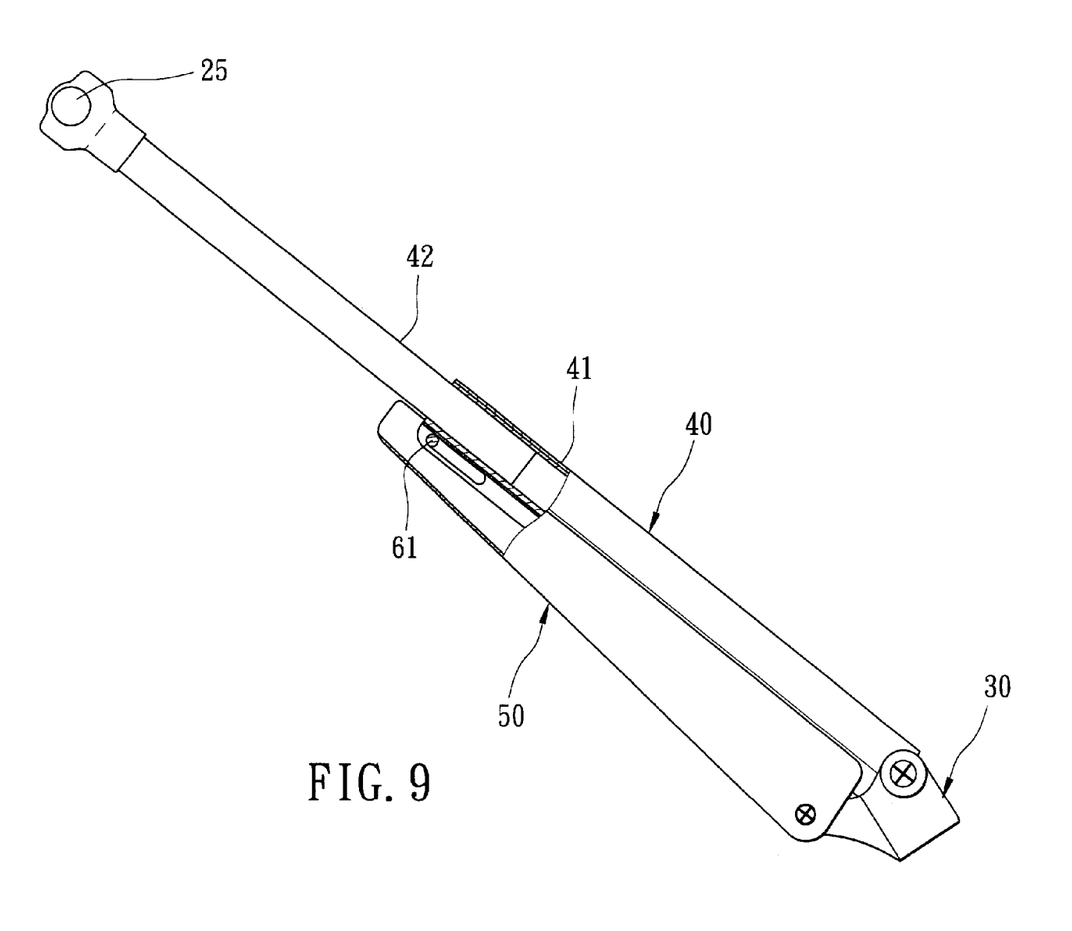
FIG. 9 is a schematic partly sectional view to illustrate how handlebar height can be adjusted in the preferred embodiment.

Referring to FIGS. 4, 5 and 7, when the lever 64 is operated such that the press member 63 moves slightly away from the cap 62, the coupling part 46 of the front pivot member 40 and the rear upper section 57 of the rear pivot member 50 are not pressed tightly against each other, and the slit 415 is opened to enable the outer tube 41 to loosely engage the inner tube 42. Hence, the inner tube 42 can be moved in the second direction to dispose the front upper section 47 of the front pivot member 40 at a desired height relative to the frame mounting member 30 in order to adjust the height of the handlebar 25 relative to a seat 24 (see FIG. 4) on the bicycle frame 21 (see FIG. 4) accordingly, as best shown in FIG. 9. At the same time, the rear pivot member 50 and the front pivot member 40 can be pivoted respectively about the second and first pivot axes so as to adjust the distance between the handlebar 25 and the seat 24 (see FIG. 4), as best shown in FIG. 8. After adjusting the handlebar 25 to the desired height and distance, the releasable fastening unit 60 can be operated to once again press the coupling part 46 of the front pivot member 40 and the rear upper section 57 of the rear pivot member 50 firmly against each other.

It has thus been shown that the adjustable handlebar mounting device of this invention permits easy adjustment of the height and distance of the handlebar 25 relative to the seat 24 on the bicycle frame 21. Moreover, the device of this invention involves a fewer number of components as compared to the prior art, thereby resulting in a simpler assembly process and lower manufacturing costs.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. An adjustable handlebar mounting device for mounting a handlebar on a bicycle frame, said adjustable handlebar mounting device comprising:
    a frame mounting member adapted to be mounted on the bicycle frame and formed with a front lug unit and a rear lug unit opposite to each other in a first direction;
    an elongate front pivot member extending in a second direction and having a front lower section and a front upper section opposite to each other in the second direction, said front lower section being connected pivotally to said front lug unit and being pivotable about a first pivot axis transverse to the first direction, said front upper section being adapted to be connected to the handlebar, said front pivot member further having a coupling part between said front lower section and said front upper section;
    an elongate rear pivot member extending in a third direction and having a rear lower section and a rear upper section opposite to each other in the third direction, said rear lower section being connected pivotally to said rear lug unit and being pivotable about a second pivot axis parallel to the first pivot axis;
    one of said coupling part of said front pivot member and said rear upper section of said rear pivot member being formed with a hole unit that has a hole axis parallel to the first and second pivot axes;
    the other of said coupling part of said front pivot member and said rear upper section of said rear pivot member being formed with a slot unit that extends along length of the other of said coupling part of said front pivot member and said rear upper section of said rear pivot member; and
    a releasable fastening unit extending through said hole unit and said slot unit and operable so as to press said coupling part of said front pivot member and said rear upper section of said rear pivot member firmly against each other, thereby enabling said rear pivot member to support said front pivot member at a desired inclination relative to said frame mounting member;
    wherein said front pivot member includes an outer tube formed with said front lower section and said coupling part, and an inner tube slidably extending into said outer tube and formed with said front upper section; and
    wherein said outer tube is formed with a slit that extends in the second direction, and a pair of coupling lugs that are disposed on opposite sides of said slit and that serve as said coupling part of said front pivot member, said slit being closed to enable said outer tube to engage tightly said inner tube when said fastening unit is operated so as to press said coupling part of said front pivot member and said rear upper section of said rear pivot member firmly against each other, thereby retaining said front upper section at a desired height relative to said frame mounting member.

2. The adjustable handlebar mounting device as claimed in claim 1, wherein said front pivot member further includes means for arresting relative rotation between said outer and inner tubes.

3. The adjustable handlebar mounting device as claimed in claim 1, wherein one of said outer and inner tubes is formed with an axially extending key therealong, and the other of said outer and inner tubes is formed with an axially extending keyway therealong to slidably engage said key and to arrest relative rotation between said outer and inner tubes while permitting sliding movement of said inner tube in the second direction relative to the outer tube.

4. The adjustable handlebar mounting device as claimed in claim 1, wherein said rear upper section of said rear pivot member is formed with a pair of wing plates that confine said coupling lugs therebetween.

5. The adjustable handlebar mounting device as claimed in claim 4, wherein said hole unit is formed in said wing plates, and said slot unit is formed in said coupling lugs.

6. The adjustable handlebar mounting device as claimed in claim 1, wherein said fastening unit includes:
    a connecting rod passing through said hole unit and said slot unit, said connecting rod having first and second ends;
    a cap mounted on said first end of said connecting rod;
    a press member having said second end of said connecting rod passing therethrough;
    a pivot mounted on said second end of said connecting rod and defining a third pivot axis transverse to said connecting rod; and
    a lever connected to said pivot and pivotable about the third pivot axis so as to urge said press member toward said cap for pressing said coupling part of said front pivot member and said rear upper section of said rear pivot member firmly against each other.

* * * * *